US006311062B1

(12) United States Patent
Sperber et al.

(10) Patent No.: US 6,311,062 B1
(45) Date of Patent: Oct. 30, 2001

(54) METHOD AND TELECOMMUNICATIONS UNIT FOR ESTABLISHING A TELECOMMUNICATIONS LINK IN SUPERPOSED DIGITAL RADIO NETWORKS

(75) Inventors: Christoph Sperber, Pforzheim; Edgar Kühn, Stuttgart; Ulrich Barth, Münchingen, all of (DE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/251,146

(22) Filed: Feb. 17, 1999

(30) Foreign Application Priority Data

Feb. 18, 1998 (DE) .................................. 198 06 616

(51) Int. Cl.⁷ ...................................... H04Q 7/20
(52) U.S. Cl. ........................ 455/426; 455/502; 455/552
(58) Field of Search ..................... 455/426, 552, 455/553, 502, 560; 370/337, 347, 442, 503

(56) References Cited

U.S. PATENT DOCUMENTS

| 5,715,282 | * | 2/1998 | Mansouri et al. | 375/350 |
| 6,038,238 | * | 3/2000 | Jokinen et al. | 370/523 |
| 6,148,023 | * | 11/2000 | Pelin et al. | 375/206 |

FOREIGN PATENT DOCUMENTS

| 26 20 491 A1 | 11/1976 | (DE) . |
| 42 36 774 A1 | 5/1994 | (DE) . |
| 43 35 480 C2 | 5/1994 | (DE) . |
| 195 46 577 A1 | 8/1996 | (DE) . |
| 195 25 363 A1 | 1/1997 | (DE) . |
| 195 11752 A1 | 10/1998 | (DE) . |
| WO 96/11533 | 4/1996 | (WO) . |
| WO96/24200 | 8/1996 | (WO) . |

OTHER PUBLICATIONS

Neuner, Hermann, et al.: "Synchronisation of Mobil Station in GMS TDMA Mobile Radio Communication System DMCS 900 (D–Netz)". In: Frequenz 47, 1993, 3–4, S. 66–72, insbes. Abs. 3.4 und 4.

Kammeyer, Karl Dirk: "Nachrichtenübertragung", B.G. Teubner Stuttgart 1992, S 196–198.

Lüke, Hans Dieter: "Korrelationssignale", Springer–Verlag, Berlin et al., 1992, S.1–10, 16–23, 190, 191, S. 195–198.

M. Mouly et al, "The GSM System for Mobile Communications", 1992, Palaiseau, France.

Michel Mouly et al, "GSM—The System for Mobile Communications, Chapter 4: The Radio Interface", 1992 Europe Media, XP000860004.

* cited by examiner

*Primary Examiner*—Nguyen T. Vo
(74) *Attorney, Agent, or Firm*—Sughrue, Mion, Zinn, Macpeak & Seas, PLLC

(57) ABSTRACT

A method for establishing a telecommunications link utilizing bursts in a digital radio network having at least one other digital radio network superposed thereon. The bursts of the two digital radio networks have the same bit structure but differ in a specific bit training sequence, and this training sequence of a burst is checked during the establishment of the telecommunications link. By processing only bursts with the training sequences of the desired digital radio network, erroneously received other bursts are filtered out and discarded.

13 Claims, 1 Drawing Sheet

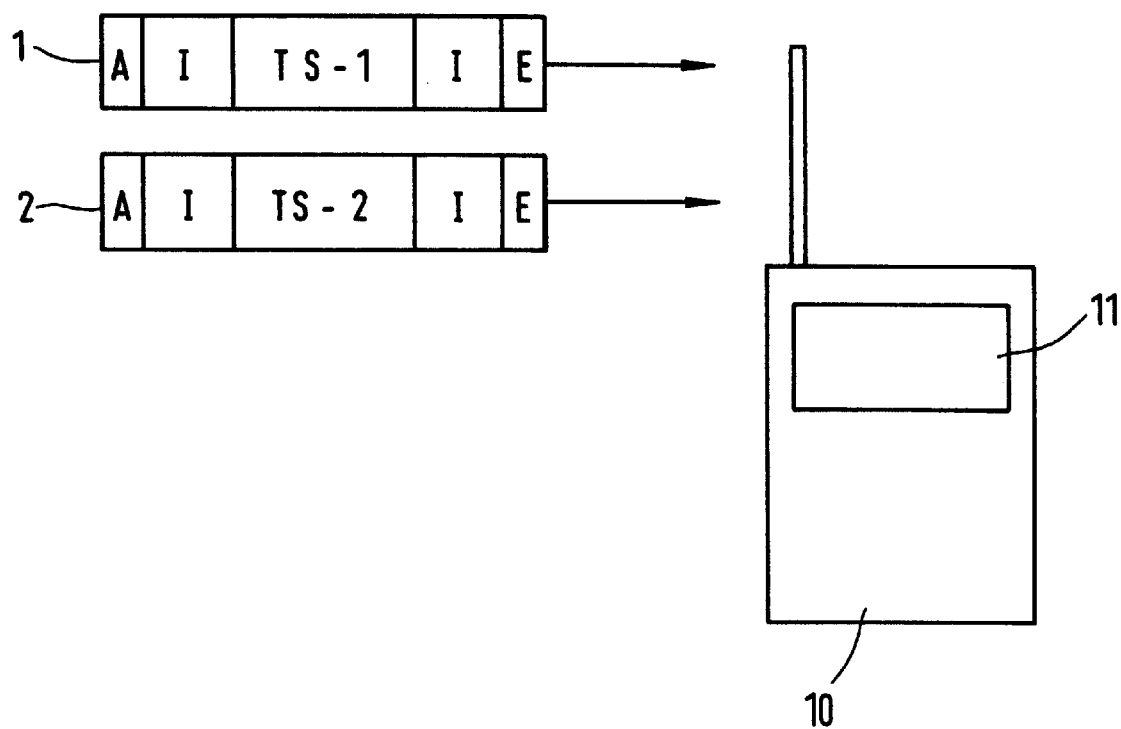

METHOD AND TELECOMMUNICATIONS UNIT FOR ESTABLISHING A TELECOMMUNICATIONS LINK IN SUPERPOSED DIGITAL RADIO NETWORKS

BACKGROUND OF THE INVENTION

This invention relates to a method for establishing a telecommunications link by means of bursts in a digital radio network having at least one other digital radio network superposed thereon, and to a telecommunications unit for establishing a telecommunications link by means of bursts in a digital radio network having at least one other digital radio network superposed thereon.

A prior-art digital radio network is described in a book by M. Mouly and M.-B. Pautet entitled "The GSM System for Mobile Communications", published by the authors in 1992, Palaiseau, France. The digital radio network described in that book is the "Global System for Mobile Communciations" (GSM), whose technical components meet the GSM standard.

In that book it is described on pages 232–237 and particularly in subchapters 4.3.1.1 and 4.3.1.3 that in GSM, training sequences are used for the transmission of radio signals, e.g. for synchronization. A single training sequence is used within a so-called synchronization burst, and eight different training sequences are used within so-called normal bursts, with the indices of the eight training sequences of the normal bursts being transmitted in the synchronization burst in coded form. By means of their training sequences, interfering similar GSM bursts which reach a receiver nearly simultaneously can be distinguished. Training sequences are inserted as specific bit sequences in the middle of the bit structure of a burst in order to minimize the distance to the information bits located at the beginning and end of the bit structure.

In the area of two superposed digital radio networks there is the risk of both digital radio networks using identical training sequences. Then, mobile stations, for example, can exchange bursts with both digital radio networks and decode such bursts, which results in mutual interference. This is possible during the synchronization phase of mobile stations, but also in their idle state or during the time of a call on an assigned traffic channel. Such interference is conceivable particularly between a public land mobile network (PLMN) and a cordless telephone system (CTS), since especially in a CTS, frequency planning for avoiding interference cannot be carried out.

SUMMARY OF THE INVENTION

It is therefore the object of the present invention to improve a method and a telecommunications unit of the respective kinds referred to at the beginning in such a way that erroneously received bursts can be detected and discarded as early as possible.

The invention is characterized in that the bursts of the two digital radio networks have the same structure but differ in a specific bit sequence (training sequence), and that this training sequence of a burst is checked during the establishment of the telecommunications link.

According to the invention, the training sequences, which have so far been used only to set a temporal zero and increase the transmission quality, are employed to distinguish different digital radio networks. By processing only bursts with the training sequence or training sequences of the desired digital radio network during the establishment of a telecommunications link, erroneously received other bursts are filtered out and discarded. Such erroneously received bursts are detected as such directly after being decoded and can be immediately discarded. By use of a so-called interleaving technique, it is possible to recover the useful information via the other received bursts.

According to the invention, bursts received from a digital network such as a PLMN, GSM, or CTS can be distinguished already at the air interface. Therefore, frequency planning between the two superposed digital radio networks is not necessary because of their different training sequences.

The proposed method thus permits fast handling of bursts of different digital networks. This results in short handover times, e.g. in the case of more than one CTS. In addition, interferences due to misrcgistrations can be reduced already in the synchronization phase. Particualarly during handover and roaming, such misregistrations are detected immediatly and can be terminated at once.

In preferred embodiments of the method according to the invention, the training sequences in the synchronization bursts and in the normal bursts are different for each digital radio network. In GSM, the training sequence of a synchronization burst consists of 64 bits (extended training sequence), surrounded by two 39-bit information packets, and the training sequence of a normal burst consists of 26 bits, surrounded by two 58-bit information packets. For a CTS or for each CTS, these GSM-specific bit sequences are modified into a CTS-specific bit sequence such that the latter is as little correlated with the GSM-specific bit sequences as possible. A mobile station of, e.g., the CTS can decode and distinguish the GSM and CTS training sequences and filter out the desired bursts.

To facilitate the demodulation of the bursts, the training sequences have optimum autocorrelation properties and preferably minimum correlation properties between each other, i.e., the training sequence or training sequences of one digital radio network and the training sequence or training sequences of the other digital radio network are minimally cross-correlated.

In another preferred embodiment, the training sequence or training sequences are different for different operators of the same digital radio network, so that bursts of different network operators can be detected and discarded in very short times.

Preferably, at least one of the digital radio networks is a public land mobile network (PLMN), such as GSM, and at least one is a cordless telecommunications network (CTS). Then it is possible to detect at an early time when a mobile station in the CTS mode falsely tries to register with a PLM or another CTS. In case of a handover, the set-up time for the new link is kept short, so that the new link establishment is more reliable, particularly in the case of a network of more than two CTS cells. Different PLMN operators in a country who also control the CTS service are assigned different training sequences for the bursts serving to establish a telecommunications link. In border areas where PLMNs of different countries are superposed, it is possible to distinguish the individual PLMNs by their different training sequences.

The above object is attained in a telecommunications unit of the kind referred to by way of introduction by an electronic filter (equalizer) which decodes the specific bit sequences (training sequence) contained in the burst signals and differing for each digital radio network, and which checks this specific training sequence or these specific training sequences. Erroneously received bursts with other training sequences are not further processed and thus discarded.

BRIEF DESCRIPTION OF THE DRAWING

Further advantages of the invention will become apparent from the following description when taken in conjunction with the accompanying drawing wherein the single figure shows highly schematically a telecommunications unit according to the invention. According to the invention, the aforementioned features and the features described in the following can be used alone or in arbitrary combinations. While a particular embodiment of the invention is shown and described, it is to be understood that the description is made only by way of example and not as a limitation to the scope of the invention.

DETAILED DESCRIPTION OF THE INVENTION

The two bursts 1, 2 have identical structures, namely a bit sequence A at the beginning and a bit sequence E at the end, two information bit sequences I, and a middle bit sequence (training sequence) TS, with the number of bits of each bit sequence being the same for both bursts 1, 2. The training sequences TS-1, TS-2 of the two bursts 1, 2 are specific to the respective digital radio network and are chosen to be different such that they have optimum autocorrelation properties and are not cross-correlated.

The two bursts 1, 2 have identical structures, namely a bit sequence A at the beginning and a bit sequence E at the end, two information bit sequences I, and a middle bit sequence (training sequence) TS, with the number of bits of each bit sequence being the same for both bursts 1, 2. The training sequences TS-1, TS-2 of the two butsts 1, 2 are specific to the respective digital radio network and are chosen to be different such that they have optimum autocorrelation properties and are not cross-correlated.

When the mobile station 10 receives a burst 1, 2, the training sequence TS-1, TS-2 of the latter will be decoded and checked for agreement with the training sequence of the desired digital radio network in an electronic filter (equalizer) 11. only if agreement is detected will the received burst 1, 2 be further processed in the mobile station 10. Erroneously received bursts with other training sequences will not be fur ther processed and thus be discarded.

What is claimed is:

1. A method for establishing a telecommunications link by:
    transmitting bursts in one digital radio network having at least one other digital radio network superposed thereon, characterized in that the bursts of the two digital radio networks have the same structure but differ in a specific bit training sequence, with the training sequences of each of said digital radio networks having the same number of bits but being minimally cross-correlated with each other, and
    checking a training sequence of a burst during the establishment of the telecommunications link,
    wherein said one digital radio network and said at least one other digital radio network are different kinds of digital radio networks.

2. A method as claimed in claim 1, characterized in that the training sequences in synchronization bursts and those in other bursts (normal bursts) are different for each digital radio network.

3. A method as claimed in claim 2, characterized in that the training sequences are different for different operators of the same digital radio network.

4. A method as claimed in claim 1, characterized in that the training sequence are different for different operators of the same digital radio network.

5. A method as claimed in claim 1, characterized in that said one digital radio network is a public land mobile network (PLMN).

6. A method as claimed claim 5, characterized in that at least one of the other digital radio networks is a cordless telecommunications network (CTS=Cordless Telephone System).

7. A method as claimed claim 1, characterized in that said one digital radio network is a cordless telecommunications network (CTS=Cordless Telephone System).

8. A method as claimed in claim 7, characterized in that at least one of the other digital radio networks is a public land mobile network (PLMN).

9. A telecommunications unit for carrying out the method claimed in claim 1, characterized by an electronic filter which checks the specific bit training sequences contained in the bursts and differing for each digital radio network.

10. A method as claimed in claim 1, characterized in that the training sequences of the respective digital radio networks are chosen to have optimum autocorrelation properties.

11. A method as claimed in claim 1, wherein said step of checking a training sequence is performed by a mobile station.

12. A method as claimed in claim 11, wherein said step of checking a training sequence comprises:
    receiving the burst transmitted from one of the digital radio networks;
    decoding the training sequence encoded within the burst;
    checking the training sequence for agreement with a specific bit sequence training sequence of a desired digital radio network, agreement identifying that the burst is from the desired digital radio network; and
    discarding the burst as erroneous when the training sequence is of a digital radio network other than the desired digital radio network,
    wherein the method for establishinig a telecommunications link further comprises further processing a burst identified as being from the desired digital radio network.

13. A method as claimed in claim 12, wherein an erroneous burst and a burst from the desired digital radio network are received superposed at the mobile station, the erroneous burst being discarded, and the burst from the desired digital radio network being further processed by the mobile station.

* * * * *